(12) United States Patent
Schlüter et al.

(10) Patent No.: US 12,004,539 B2
(45) Date of Patent: Jun. 11, 2024

(54) METHODS FOR CREATING OF HIGH FIBROUSNESS, HIGH MOISTURE EXTRUDATES

(71) Applicant: The Livekindly Company Switzerland GmbH, Pfäffikon (CH)

(72) Inventors: Marco Schlüter, Quakenbrück (DE); Achim Knoch, Minden (DE)

(73) Assignee: The Livekindly Company Switzerland GmbH, Pfaffikon (CH)

( * ) Notice: Subject to any disclaimer, the term of this patent is extended or adjusted under 35 U.S.C. 154(b) by 0 days.

(21) Appl. No.: 17/829,165

(22) Filed: May 31, 2022

(65) Prior Publication Data

US 2023/0240342 A1     Aug. 3, 2023

Related U.S. Application Data

(60) Provisional application No. 63/305,170, filed on Jan. 31, 2022.

(51) Int. Cl.
| | |
|---|---|
| *A23L 11/00* | (2021.01) |
| *A23L 5/10* | (2016.01) |
| *A23L 19/00* | (2016.01) |

(52) U.S. Cl.
CPC ............. *A23L 11/05* (2016.08); *A23L 5/13* (2016.08); *A23L 19/09* (2016.08)

(58) Field of Classification Search
None
See application file for complete search history.

(56) References Cited

U.S. PATENT DOCUMENTS

| | | | |
|---|---|---|---|
| 2,914,103 A | 11/1959 | Ferris | |
| 3,488,770 A | 1/1970 | Atkinson | |
| 3,496,858 A | 2/1970 | Jenkins | |
| 3,778,522 A * | 12/1973 | Strommer | A23J 3/26 426/511 |
| 4,017,646 A * | 4/1977 | Hoer | A23J 3/28 426/802 |

(Continued)

FOREIGN PATENT DOCUMENTS

| | | |
|---|---|---|
| AU | 2002315573 B2 | 7/2005 |
| CA | 3100909 A1 | 12/2019 |

(Continued)

OTHER PUBLICATIONS

Ducrocq et al., "Rubisco: A promising plant protein to enrich wheat-based food without impairing dough viscoelasticity and protein polymerisation", Jun. 21, 2020, 13 pages.

(Continued)

*Primary Examiner* — Lien T Tran
(74) *Attorney, Agent, or Firm* — Carr & Ferrell LLP

(57) ABSTRACT

Provided herein are exemplary methods for creating high fibrousness, high moisture extrudates by selecting a raw material for use in an extruder, selecting an additive for use in the extruder, and selecting a parameter for operating the extruder. Further methods include opening the structure and surface of extrudate, applying a needle roller to the extrudate, adding gas, steam and/or water between the extruder and a die. Additionally, the extrudate may be cooked with high water absorption, increasing water absorption from approximately 40% to approximately 80%.

19 Claims, 13 Drawing Sheets

(56) References Cited

U.S. PATENT DOCUMENTS

| | | | |
|---|---|---|---|
| 4,132,809 | A | 1/1979 | Desrosier |
| 4,208,476 | A | 6/1980 | Tsao |
| 4,226,576 | A | 10/1980 | Hildebolt |
| 4,367,240 | A | 1/1983 | MacLennan |
| 4,555,485 | A | 11/1985 | Marsh |
| 4,615,901 | A * | 10/1986 | Yoshioka ............ A23J 3/26 |
| | | | 426/802 |
| 5,565,234 | A | 10/1996 | Teraguchi et al. |
| 5,909,958 | A | 6/1999 | Rauwendaal |
| 5,919,509 | A | 7/1999 | Cremers et al. |
| 6,379,738 | B1 | 4/2002 | Dingman et al. |
| 8,603,555 | B2 | 12/2013 | Innocenzi |
| 8,685,485 | B2 | 4/2014 | McMindes et al. |
| 9,161,556 | B2 | 10/2015 | Fisk |
| 9,750,268 | B1 | 9/2017 | Thomas |
| 10,172,380 | B2 | 1/2019 | Varadan et al. |
| 10,287,568 | B2 | 5/2019 | Kale et al. |
| 10,499,663 | B2 | 12/2019 | Kivelä et al. |
| 10,745,682 | B2 | 8/2020 | Sebastian et al. |
| 11,224,236 | B2 * | 1/2022 | Murata ............... A23P 30/20 |
| 2005/0064087 | A1 | 3/2005 | Richey |
| 2005/0226971 | A1 | 10/2005 | Schuppan et al. |
| 2008/0248167 | A1 | 3/2008 | McMindes et al. |
| 2010/0021593 | A1 | 1/2010 | Denis |
| 2010/0074998 | A1 | 3/2010 | Vega et al. |
| 2011/0086130 | A1 | 4/2011 | Axelrod |
| 2012/0093994 | A1 | 4/2012 | Hsieh et al. |
| 2012/0207904 | A1 * | 8/2012 | Twombly ............ A23L 13/426 |
| | | | 426/574 |
| 2012/0237648 | A1 | 9/2012 | Ortiz |
| 2013/0216674 | A1 | 8/2013 | Haines et al. |
| 2015/0044334 | A1 | 2/2015 | Walther et al. |
| 2015/0296834 | A1 | 10/2015 | Geistlinger |
| 2015/0351427 | A1 | 12/2015 | Rose et al. |
| 2016/0326484 | A1 | 11/2016 | Jewell |
| 2016/0338392 | A1 | 11/2016 | Gillette et al. |
| 2017/0303558 | A1 | 10/2017 | Eisner et al. |
| 2019/0008192 | A1 | 1/2019 | Brown et al. |
| 2019/0037893 | A1 | 2/2019 | Ajami et al. |
| 2019/0045809 | A1 | 2/2019 | Lee et al. |
| 2019/0200658 | A1 | 7/2019 | Vrljic et al. |
| 2019/0216106 | A1 | 7/2019 | Geistlinger et al. |
| 2019/0246679 | A1 | 8/2019 | Murphy et al. |
| 2020/0037654 | A1 | 2/2020 | Wang |
| 2020/0157506 | A1 | 5/2020 | Bayer et al. |
| 2020/0323238 | A1 | 10/2020 | Pibarot |
| 2021/0037852 | A1 * | 2/2021 | Chessari ............. A23J 3/227 |
| 2021/0100263 | A1 * | 4/2021 | Chessari ............. A23P 30/20 |
| 2021/0106026 | A1 | 4/2021 | Mudgal et al. |
| 2022/0202038 | A1 | 6/2022 | Knoch et al. |
| 2022/0202039 | A1 | 6/2022 | Knoch |
| 2022/0202040 | A1 | 6/2022 | Knoch |
| 2022/0202041 | A1 | 6/2022 | Knoch |
| 2022/0202054 | A1 | 6/2022 | Daoust |
| 2022/0202060 | A1 | 6/2022 | Knoch |
| 2022/0203593 | A1 | 6/2022 | Knoch et al. |
| 2022/0217994 | A1 * | 7/2022 | Ellis .................... A23J 3/14 |
| 2023/0000117 | A1 | 1/2023 | Knoch |
| 2023/0034165 | A1 | 2/2023 | Schlüter |
| 2023/0063655 | A1 | 3/2023 | Daoust |
| 2023/0189841 | A1 | 6/2023 | Daoust et al. |
| 2023/0240350 | A1 | 8/2023 | Schlüter et al. |

FOREIGN PATENT DOCUMENTS

| | | |
|---|---|---|
| CN | 104171016 A | 12/2014 |
| CN | 105495561 A | 4/2016 |
| CN | 106514983 A | 3/2017 |
| CN | 110623081 A | 12/2019 |
| CN | 111869787 A | 11/2020 |
| CN | 111903833 A | 11/2020 |
| CN | 112006152 A | 12/2020 |
| CN | 213153713 U | 5/2021 |
| DE | 2257593 A1 | 5/1974 |
| DE | 3714593 A1 | 11/1988 |
| DE | 102013220746 A1 | 4/2015 |
| EP | 1526959 B1 | 4/2007 |
| EP | 3100843 A1 | 12/2016 |
| EP | 3524059 B1 | 7/2020 |
| ES | 2165805 A1 | 3/2002 |
| JP | H07000164 | 1/1995 |
| JP | 2021508483 A | 3/2021 |
| WO | WO1998049902 A1 | 11/1998 |
| WO | WO2001049474 A1 | 7/2001 |
| WO | WO2016022114 A1 | 2/2016 |
| WO | WO2016120594 A1 | 8/2016 |
| WO | WO2016151064 A1 | 9/2016 |
| WO | WO2017127416 A1 | 7/2017 |
| WO | WO2018177717 A1 | 10/2018 |
| WO | WO2019129744 A1 | 7/2019 |
| WO | WO2019143859 A1 | 7/2019 |
| WO | WO2019231938 A1 | 12/2019 |
| WO | WO2020030628 A1 | 2/2020 |
| WO | WO2020037368 A1 | 2/2020 |
| WO | WO2020038541 A1 | 2/2020 |
| WO | WO2020079440 A1 | 4/2020 |
| WO | WO2020092306 A1 | 5/2020 |
| WO | WO2020152689 A1 | 7/2020 |
| WO | WO2020154634 A1 | 7/2020 |
| WO | WO2020180651 A1 | 10/2020 |
| WO | WO2020208104 A1 | 10/2020 |
| WO | WO2020210547 A1 | 10/2020 |
| WO | WO2020232347 A1 | 11/2020 |

OTHER PUBLICATIONS

Stefano et al., "Plant RuBisCo: An Underutilized Protein for Food Applications", Aug. 13, 2018, 12 pages.

Thewis et al., "Livestock Production: Prospects Over the Next Decades and Alternative Protein Bioresources", AgroLife Scientific Journal—vol. 1, 2012, 10 pages.

Yuliarti et al., "Structuring the meat analogue by using plant-based derived composites," Journal of Food Engineering, vol. 288, Jan. 2021, available on the Internet <URL:https://doi.org/10.1016/j.jfoodeng.2020.110138>, 3 pages (abstract only).

Dekkers et al., "Structuring processes for meat analogues," Trends in Food Science & Technology, vol. 81, Nov. 2018, pp. 25-36.

Mattice et al., "Comparing methods to produce fibrous material from zein," Food Research International, vol. 128, Feb. 2020, available on the Internet <URL:https://www.sciencedirect.com/science/article/abs/pii/S0963996919306908>, 3 pages (abstract only).

Mattice, "Characterizations of Zein: Evaluating Functionality and Potential uses in Food Structuring," Ph.D. thesis at University of Guelph, Guelph, Ontario, Canada, 145 pages.

Samard et al., "A comparison of physicochemical characteristics, texture, and structure of meat analogue and meats," Journal of the Science of Food and Agriculture, vol. 99, Issue 6, Apr. 2019, pp. 2708-2715, available on the Internet <URL:https://onlinelibrary.wiley.com/doi/abs/10.1002/jsfa.9438 https://onlinelibrary.wiley.com/doi/abs/10.1002/jsfa.9438>, 2 pages (abstract only).

Nieuwland et al., "Food-grade electrospinning of proteins," Innovative Food Science & Emerging Technologies, vol. 20, Oct. 2013, pp. 269-275.

Schreuders et al., "Comparing structuring potential of pea and soy protein with gluten for meat analogue preparation," Journal of Food Engineering, vol. 261, Nov. 2019, pp. 32-39.

Knoch, "Systems and Methods for Vacuum Cooking," U.S. Appl. No. 17/366,720, filed Jul. 2, 2021; Specification, Claims, Abstract, and Drawings, 42 pages.

Fiberstar, "Food Applications: Naturla Citrus Fiber | High Water Holding | Emulsification | Gelling Properties," [online], [retrieved on Dec. 21, 2021], Retrieved from the Internet: <URL:https://www.fiberstar.net/citrus-fiber-food-applications/>, 6 pages.

Gelski et al., "Plant-based burgers work to duplicate flavor, texture of protein-based varieties," Meat+Poultry, [online], [retrieved on Dec. 21, 2021], Retrieved from the Internet: <URL:https://www.meatpoultry.com/articles/23164-plant-based-burgers-work-to-duplicate-flavor-texture-of-protein-based-varieties>, 3 pages.

(56) References Cited

OTHER PUBLICATIONS

Osen et al, "High-Moisture Extrusion: Meat Analogues," In: Reference Module in Food Science, Jan. 1, 2016, DOI: 10.1016/B978-0-08-100596-5.03099-7, Retrieved from the Internet: <URL:http://dx.doi.org/10.I016/B978-0-08-I00596-5.03099-7>, 7 pages.

Mannar et al., "Micronutrient Fortification of Foods—Rationale, Application and Impact," Indian Journal of Pediatrics, vol. 71, Nov. 2004, [Retrieved on Feb. 23, 2022] Retrieved from Internet <URL:https://doi.org/10.1007/BF02828115>, pp. 997-1002.

Osendarp et al. "Large-Scale Food Fortification and Biofortification in Low- and Middle-Income Countries: A Review of Programs, Trends, Challenges, and Evidence Gaps," Food and Nutrition Bulletin, vol. 39, Issue 2, Jun. 24, 2018, [Retrieved on Feb. 23, 2022] Retrieved from Internet <URL:https://www.ncbi.nlm.nih.gov/pmc/articles/PMC7473077/>, <DOI:10.1177/0379572118774229>, pp. 315-331.

Vatansever S. et al, "Low- and High-Moisture Extrusion of Pulse Proteins as Plant-Based Meat Ingredients: A Review," Cereal Foods World, vol. 65, No. 4, DOI: https://doi.org/10.1094/CFW-65-4-0038, Aug. 1, 2020, 11 pages.

\* cited by examiner

| Compound | Hemp | Soy | | Compound | Hemp | Gluten | | Compound | Soy | Gluten | | Compound | Hemp | Gluten | Soy |
|---|---|---|---|---|---|---|---|---|---|---|---|---|---|---|---|
| 1 | 0.00% | 100.00% | | 22 | 100.00% | 0.00% | | 43 | 100.00% | 0.00% | | 64 | 100.00% | 0.00% | 0.00% |
| 2 | 5.00% | 95.00% | | 23 | 95.00% | 5.00% | | 44 | 95.00% | 5.00% | | 65 | 95.00% | 2.50% | 2.50% |
| 3 | 10.00% | 90.00% | | 24 | 90.00% | 10.00% | | 45 | 90.00% | 10.00% | | 66 | 90.00% | 5.00% | 5.00% |
| 4 | 15.00% | 85.00% | | 25 | 85.00% | 15.00% | | 46 | 85.00% | 15.00% | | 67 | 85.00% | 7.50% | 7.50% |
| 5 | 20.00% | 80.00% | | 26 | 80.00% | 20.00% | | 47 | 80.00% | 20.00% | | 68 | 80.00% | 10.00% | 10.00% |
| 6 | 25.00% | 75.00% | | 27 | 75.00% | 25.00% | | 48 | 75.00% | 25.00% | | 69 | 75.00% | 12.50% | 12.50% |
| 7 | 30.00% | 70.00% | | 28 | 70.00% | 30.00% | | 49 | 70.00% | 30.00% | | 70 | 70.00% | 15.00% | 15.00% |
| 8 | 35.00% | 65.00% | | 29 | 65.00% | 35.00% | | 50 | 65.00% | 35.00% | | 71 | 65.00% | 17.50% | 17.50% |
| 9 | 40.00% | 60.00% | | 30 | 60.00% | 40.00% | | 51 | 60.00% | 40.00% | | 72 | 60.00% | 20.00% | 20.00% |
| 10 | 45.00% | 55.00% | | 31 | 55.00% | 45.00% | | 52 | 55.00% | 45.00% | | 73 | 55.00% | 22.50% | 22.50% |
| 11 | 50.00% | 50.00% | | 32 | 50.00% | 50.00% | | 53 | 50.00% | 50.00% | | 74 | 50.00% | 25.00% | 25.00% |
| 12 | 55.00% | 45.00% | | 33 | 45.00% | 55.00% | | 54 | 45.00% | 55.00% | | 75 | 45.00% | 27.50% | 27.50% |
| 13 | 60.00% | 40.00% | | 34 | 40.00% | 60.00% | | 55 | 40.00% | 60.00% | | 76 | 40.00% | 30.00% | 30.00% |
| 14 | 65.00% | 35.00% | | 35 | 35.00% | 65.00% | | 56 | 35.00% | 65.00% | | 77 | 35.00% | 32.50% | 32.50% |
| 15 | 70.00% | 30.00% | | 36 | 30.00% | 70.00% | | 57 | 30.00% | 70.00% | | 78 | 30.00% | 35.00% | 35.00% |
| 16 | 75.00% | 25.00% | | 37 | 25.00% | 75.00% | | 58 | 25.00% | 75.00% | | 79 | 25.00% | 37.50% | 37.50% |
| 17 | 80.00% | 20.00% | | 38 | 20.00% | 80.00% | | 59 | 20.00% | 80.00% | | 80 | 20.00% | 40.00% | 40.00% |
| 18 | 85.00% | 15.00% | | 39 | 15.00% | 85.00% | | 60 | 15.00% | 85.00% | | 81 | 15.00% | 42.50% | 42.50% |
| 19 | 90.00% | 10.00% | | 40 | 10.00% | 90.00% | | 61 | 10.00% | 90.00% | | 82 | 10.00% | 45.00% | 45.00% |
| 20 | 95.00% | 5.00% | | 41 | 5.00% | 95.00% | | 62 | 5.00% | 95.00% | | 83 | 5.00% | 47.50% | 47.50% |
| 21 | 100.00% | 0.00% | | 42 | 0.00% | 100.00% | | 63 | 0.00% | 100.00% | | 84 | 0.00% | 50.00% | 50.00% |

FIG. 1B

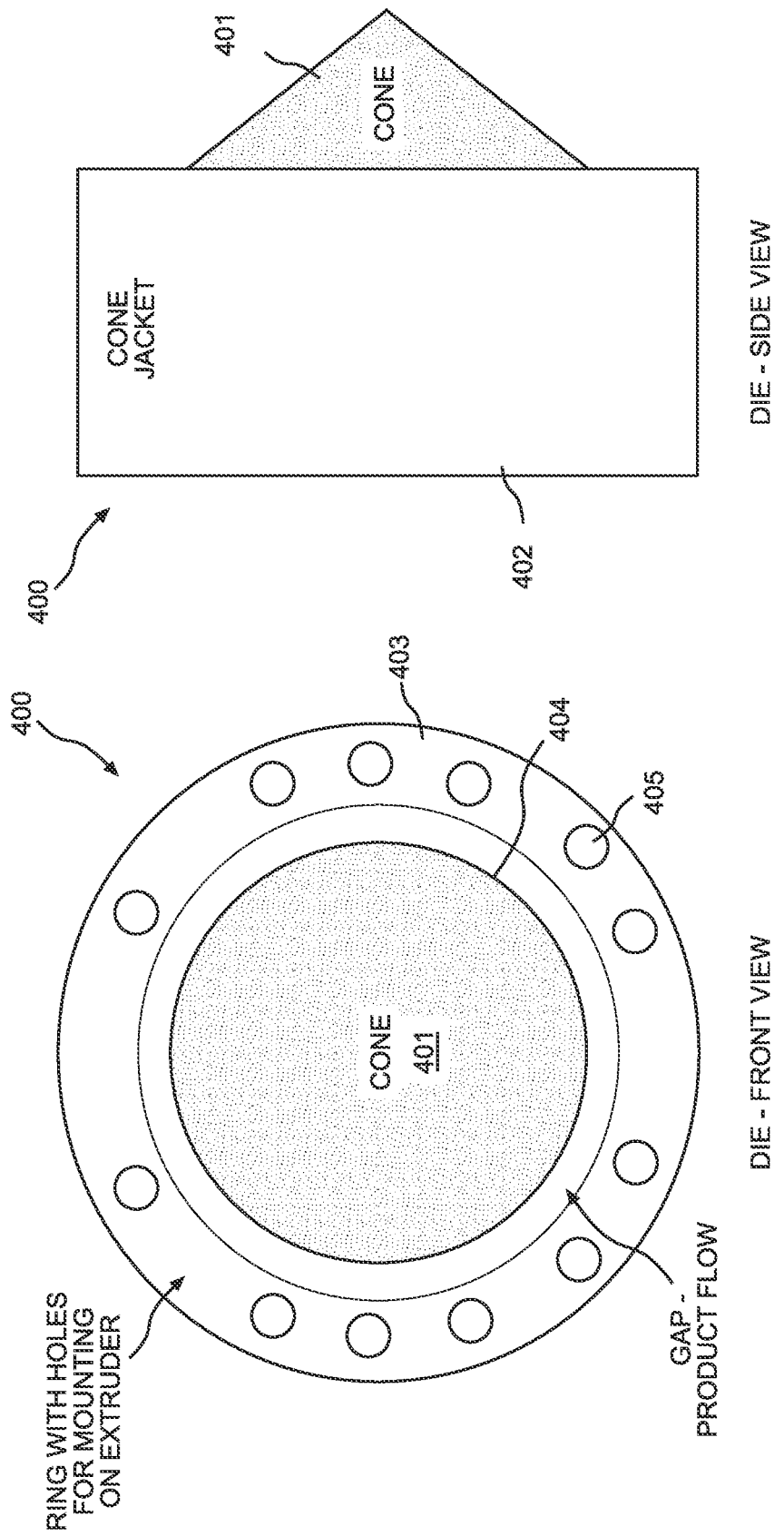

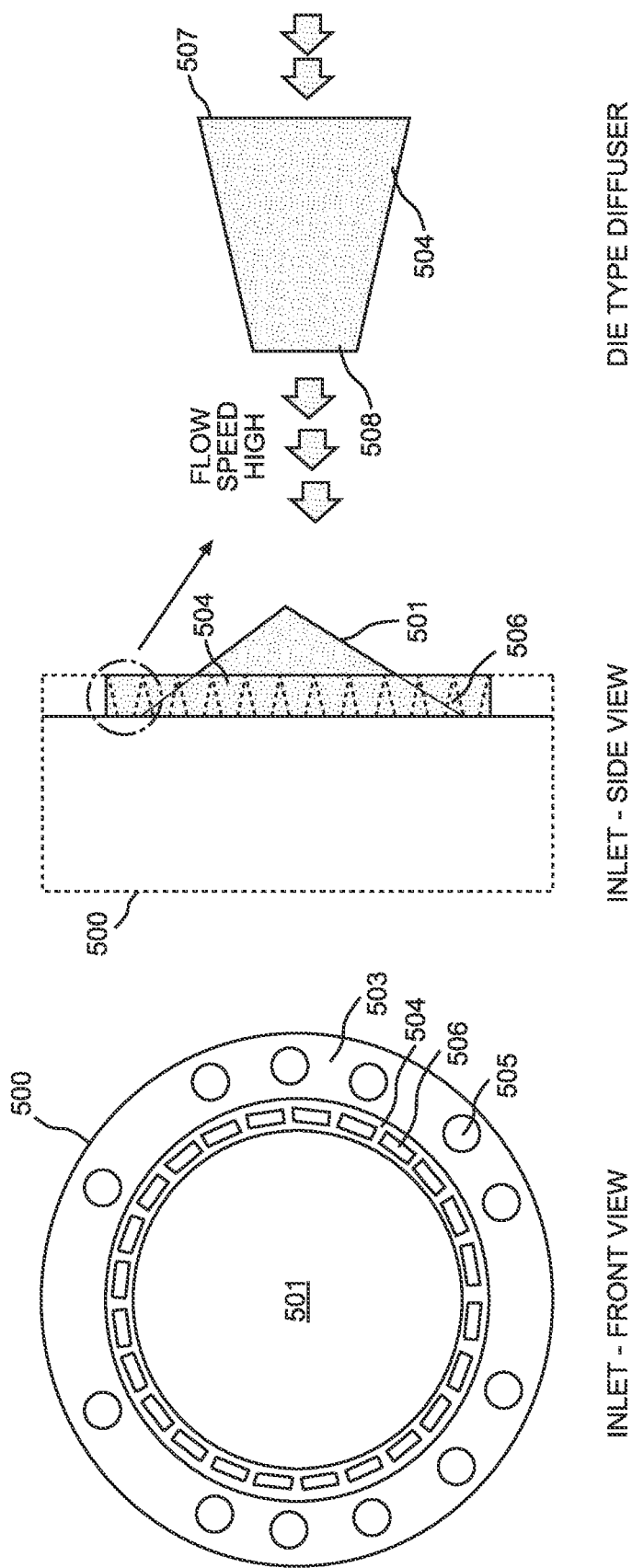
FIG. 12A INLET - FRONT VIEW
FIG. 12B INLET - SIDE VIEW
FIG. 12C DIE TYPE DIFFUSER

METHODS FOR CREATING OF HIGH FIBROUSNESS, HIGH MOISTURE EXTRUDATES

CROSS-REFERENCE TO RELATED APPLICATIONS

The present U.S. Non-Provisional Patent application claims priority benefit to U.S. Provisional Patent Application Ser. No. 63/305,170 filed on Jan. 31, 2022 and titled "Cooling Die High Velocity Stream Inlets," and is hereby incorporated by reference in its entirety.

FIELD OF THE TECHNOLOGY

The present technology relates generally to high fibrousness, high moisture extrudates.

SUMMARY

Provided herein are exemplary methods for creating high fibrousness, high moisture extrudates by selecting a raw material for use in an extruder, selecting an additive for use in the extruder, and selecting a parameter for operating the extruder. Further methods include opening the structure and surface of extrudate, applying a needle roller to the extrudate, adding gas, steam and/or water between the extruder and a die. Additionally, the extrudate may be cooked with high water absorption, increasing water absorption from approximately 40% to approximately 80%.

According to various exemplary embodiments, the raw material may include a combination of hemp and soy, a combination of hemp and gluten, or a combination of hemp, soy and gluten. The additive may include sodium hydroxide in a range of approximately 0.05% to approximately 1.00%, and nitrogen in a range of approximately 0.01% to approximately 5.00%. The extrudate may be boiled in water to achieve a high water absorption of between approximately 20% and 120%, or boiling the extrudate in water and spice to achieve high water and spice absorption of between approximately 20% and 120%. A marinade may be added before or during the cooking, with a content of the marinade ranging from approximately 1% to approximately 20%.

The combinations of proteins, in some exemplary embodiments, is 25% hemp and 75% soy, 35% hemp and 65% soy, 45% hemp and 55% soy or 55% hemp and 45% soy.

In some embodiments the present technology is directed to a system for producing long fibers via high velocity cooling die stream inlets in a High Moisture Extrusion process, the system comprising: an extruder to mix ingredients to turn them into a protein extrudate; a cooling die to cool the protein extrudate and to cool an enhanced extrudate with ingredients added after the extruder the cooling die further comprising: one or more flow channel entrances for entry of the protein extrudate into the cooling die; one or more entrance cones to direct the movement of the protein extrudate into the one or more flow channel entrances; and one or more cooling die inlet inserts at the one or more flow channel entrances, wherein the cooling die inlet inserts are coupled with the one or more flow channel entrances to create one or more narrow high velocity entrances for the protein extrudate into the cooling die, wherein the high velocity inlets accelerate the flow of the protein extrudate as it enters the cooling die. In various embodiments the one or more narrow high velocity entrances include a diffusion pattern.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1B shows 64 exemplary structure-forming protein combinations.

FIGS. 11A-11B present one embodiment of a traditional cooling die inlet end. Callout numbers originate from the underlying Provisional Patent Application Serial No. 63/305,170.

FIGS. 12A-12C present one embodiment of high velocity cooling die stream inlets.
Callout numbers originate from the underlying Provisional Patent Application Serial No. 63/305,170.

DETAILED DESCRIPTION

Figure 1A:
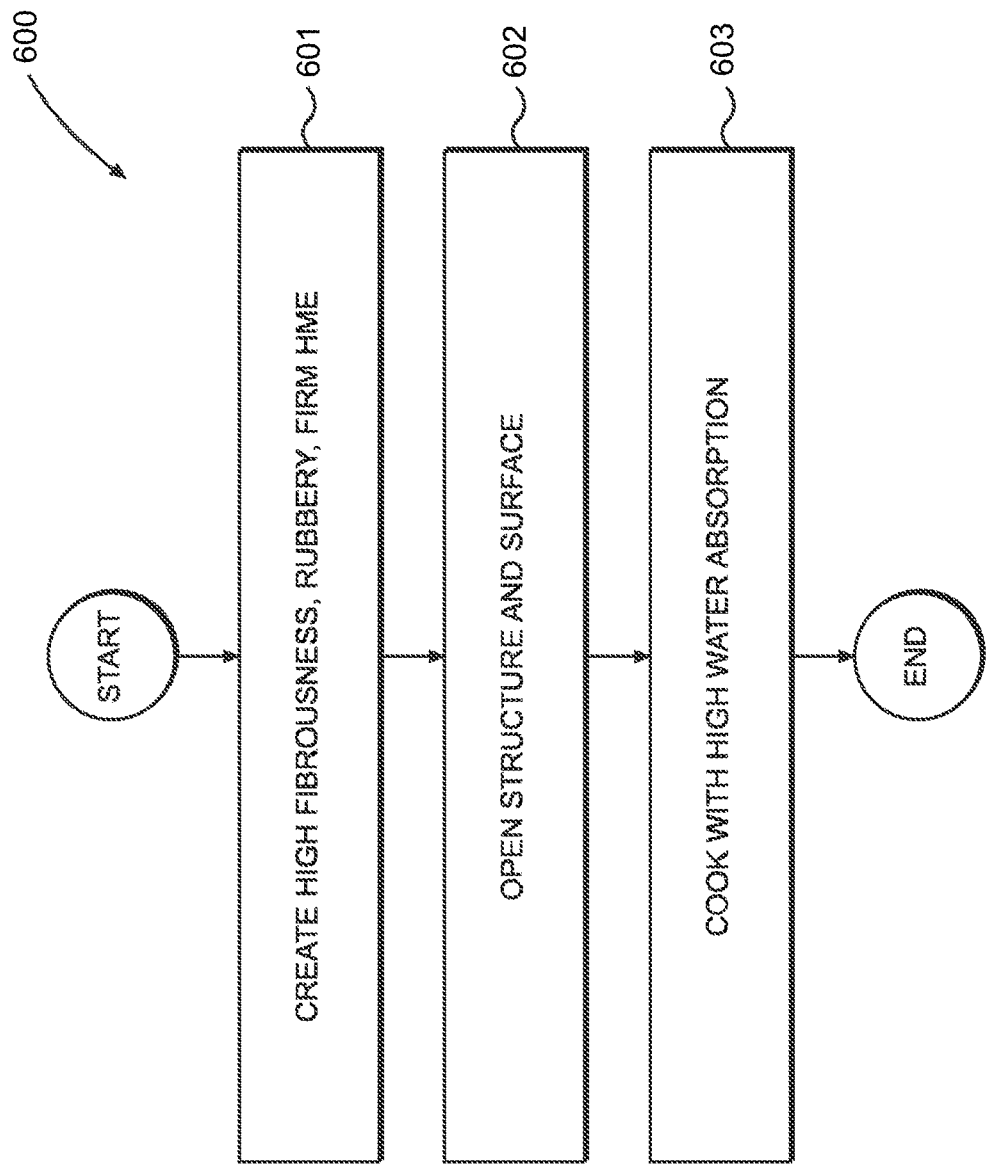
FIG. 1A is an exemplary flowchart for creating a high moisture extrudate ("HME") with high water uptake.

Meat analogues and meat alternative products made out of plant proteins (including also protein enriched flours, concentrates and isolates) and plant products are gaining in popularity, this is due to a variety of factors including increased environmental consciousness. However, in their current state, meat analogues, meat alternatives and plant-based foods and proteins may suffer from several disadvantages and shortcomings relative to natural meat. Some obvious disadvantages and shortcomings of current alternative meat products are their taste and texture, which are different from and fail to replicate the taste and texture of natural meats, these alternatives also fail to resemble meats in color and other physical aspects.

Therefore, in the field of meat analogue or meat alternative manufacturing processes, it is generally accepted that there are several goals that the final meat analogue product and the manufacturing process itself must meet; these include alternative meat products that are desirable to the senses, tasty and affordable. More specifically, the alternative meat products should have a texture very similar to that of natural meats. A meat-like texture allows the bite or crunch of a meat analogue product to feel like that of natural meats to the consumer. Other goals are for the meat analogue to taste like and have the same color and/or physically resemble natural meats.

To realize these goals, the meat analogue industry has moved towards a High Moisture Extrudate (HME) extrusion process. An HME extrusion process may include shearing. It is generally accepted that the HME extrusion process involves several standardized steps, these steps may be modifiable, altered, added to, or removed depending on the mixtures, recipes and ingredients used as well as the desired product outcome. However, the standard process includes feeding and conveying ingredients into an extruder, mixing, heating and melting the extrudate mixture and compressing the mixture and then to achieve and/or maintain the desired meat-like texture, to press the extrudate mixture into a cooling die which further cools and structures the mixture. In this process, protein and water can be mixed in a ratio of 1:1, 1:2 (one part protein and two parts water), 1:3 (one part protein and three parts water), 2:1 (two parts protein and one part water), 2:2 (two parts protein and two parts water) or in any other ratio, both materials are added to the extruder together or separately. The challenge, however, is to produce an HME material with high water absorption.

Generally, after the HME extrusion process the extrudate mixture is cut or sheared to determine the shape and size of the final product and to allow the ingress and uptake of moisture by the extrudate and then cooked in water for around 20 mins to increase juiciness, creating a meat-like feel to the bite as part of a series of post-processing steps. However, cooking in water softens the extrudate, and the longer the extrudate is cooked in water, the softer it gets, losing its meat like fiberization that was produced in the extruder and cooling die portions of the HME extrusion process.

The HME extrusion process therefore uses the extruder for mixing ingredients to form a protein extrudate/texturate, and then uses an interim plate to connect the extruder to a cooling die, where the extrudate would move through to enter the die. There is usually an inlet to the cooling die with a particular shape that would facilitate or direct the flow of the extrudate towards a certain direction to enter the die. By the time the extrudate enters the die, the extrudate has cooled for a small amount, but the primary cooling and the place where the fibers and structure of the protein mix extrudate/texturate are largely formed and the extrudate becomes difficult to alter, is after the extrudate is cooled and structured inside the cooling die. Usually, the post-cooling steps after the cooling die such as cutting, and cooling are used to add new ingredients, textures, or flavors into the protein extrudate.

Post-processing steps may also be added after the HME extrusion process after the cooling die which may include cutting and shearing the protein, or more typically after the extrudate mixture leaves the cooling die, and these steps may include cutting, shearing, cooking, freezing, storing, or adding flavors, fats and other food manufacturing and culinary additives.

A texturized product, or in other embodiments an extrudate mixture that is fed into and/or is created in an extruder may be comprised of any food manufacturing ingredient including and not limited to plant proteins, soy or pea proteins or isolates, plant protein concentrates, protein isolates, meat proteins and compositions, and protein products and concentrates, as well as additives such as flavor enhancers, preservatives, PH agents, color additives, fats, bonding agents and compositions, salts as well water, other solutions and liquids. The extrudate mixture may be pre-mixed before feeding into the extruder or separate components may be added individually into the extruder, or a combination of both.

FIG. 1A is an exemplary flowchart for how to generate a HME material with high water uptake.

According to various exemplary embodiments, a structure is produced that closely matches the structure of meat, preferably as a whole muscle. To achieve this goal, optimization of HME structure is aimed at different levels (process, recipe, pre- and post-processing technology).

At step 101, a high fibrousness, rubbery, firm high moisture extrudate is created.

With respect to materials to form the HME, highly structured protein is used, in some cases hemp in a range of approximately 0% to 100%, soy in a range of 0% to approximately 100% and gluten in a range of approximately 0% to 100%. Additionally, strong structure-forming protein combinations may be utilized, including:

Hemp-Soy;
Hemp-Gluten;
Soy-Gluten;
Hemp-Soy-Gluten; and
Other alternative proteins, including peas FIG. 1B shows 64 exemplary structure-forming protein combinations.

With respect to parameter settings of the extruder, in exemplary embodiments, higher temperatures and increased shearing are employed. With respect to additives, the goal is to increase the pH (e.g., 6 or 6.8 to 7.5) for increased water uptake into the HME. It is interesting to note that the HME is sensitive to changes in pH.

The extrusion process typically involves:
High energy input (e.g., specific mechanical energy input);
High product temperature by high barrell temperature at approximately 100 degrees Celsius to 200 degrees Celsius;
High screw speed at approximately 500 to 1200 revolutions per minute;
Adding gas, e.g., Nitrogen in volumes (of the extruder) of approximately 0%, 1% to 5%; and
Adding additives, e.g., Sodium Hydroxide in volumes (of the extruder) of approximately 0%, 0.05% to 1%. Other additives may be used to influence the pH value.

At step 102, the structure and surface of the high moisture extrudate is opened. This step happens after the extrusion and after the cooling die. The structure and surface are opened and a needle roller is used to increase the uptake of water. The opening of the structure may be performed with a mechanical stress, such as with a needle roller, a roller mill or similar processes. In some exemplary embodiments, the HME material, after undergoing the HME process and passing through a control system, is precut, then fine cut into any shape via a continuous cutter or other such equipment. The extrudate may also be used as a material for the production of formed products. For this purpose, the material may be comminuted before it is used in a dough.

Additionally, gas (e.g., pure Nitrogen) is added in the extruder to make the HME more sponge-like (in some cases having a thickness of 10-12 millimeters) with the ability to increase the uptake of water. The aim here is not to create a sponge structure but to enable the structure to absorb more water. It will be sponge like as air bubbles are included, but these bubbles are super fine and cannot be seen by the naked eye directly. At the same time, the fiber is divided and less homogenous.

With respect to adding gas, steam and water between the extruder and die, in some embodiments the present technology is directed to a system for dosing and mixing ingredients in a High Moisture Extrusion process, the system comprising: an extruder to mix ingredients to turn them into a protein extrudate; a cooling die to cool the protein extrudate and to cool an enhanced extrudate with ingredients added after the extruder; an interim plate connecting the extruder and the cooling die, to add and mix further ingredients, and facilitate movement of the protein extrudate and the enhanced extrudate into the cooling die, the interim plate further comprising: one or more interim plate inlets to allow the entry of the protein extrudate from the extruder into the interim plate; one or more dosing inlets for adding new ingredients to the protein extrudate that exits the extruder and enters the interim plate, the dosing inlets being placed on any location on the interim plate; an at least one static mixer, which mixes the new ingredients with the protein extrudate to form the enhanced extrudate; one or more flow channels to facilitate the movement of the extrudate and the enhanced extrudate through the interim plate (which may also include inserts and a special feeding system to the interim plate) and into one or more channels of the cooling die; and one or more interim plate outlets to allow the flow of the protein extrudate and the enhanced extrudate into the cooling die.

In various embodiments, the system incorporates a low degree of mixing by the static mixer, when mixing new ingredients with the protein extrudate to form the enhanced extrudate. This ensures that the enhanced extrudate is not homogenized.

At step 103, the high moisture extrudate is cooked with high water absorption. In various exemplary embodiments, this process is performed with or without vacuum cooking and may last approximately 15 to 90 minutes. In various exemplary cases, water absorption increases from approximately 40% to approximately 80%.

The cooking process typically involves:
Boiling in water to achieve high water absorption of approximately 20% to 120%;
Boiling in water—spice (or a flavor(s)) mix to achieve high water and spice absorption of approximately 20% to 120%; and
Adding marinade before or during the cooking process to achieve an approximate marinade content of 1% to 20%.

Figure 2A:
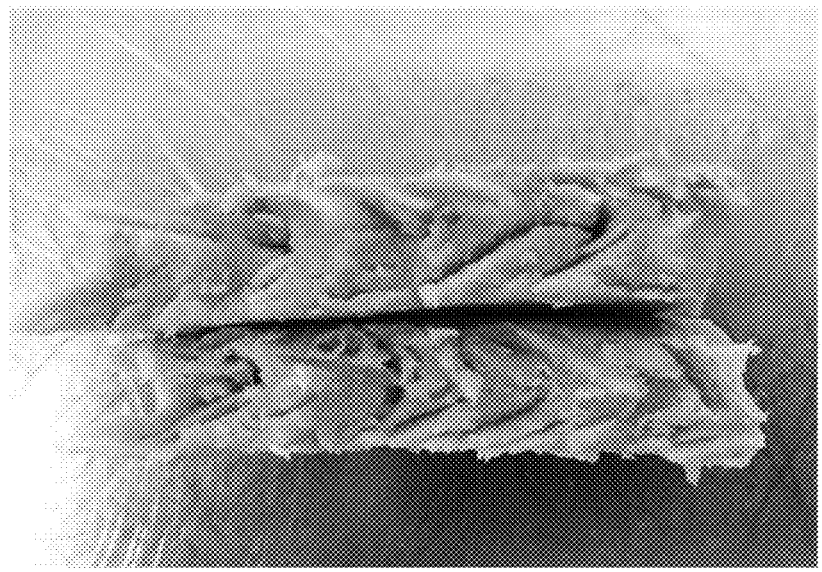
FIG. 2A shows structural characteristics of a standard HME after extrusion.

FIG. 2A shows structural characteristics of a standard HME after extrusion.

As shown by the exemplary standard HME after extrusion, the properties include:
Medium fibrous structure;
Low juiciness;
Medium compactness;
Medium homogeneity; and
Medium strength.

Figure 2B:
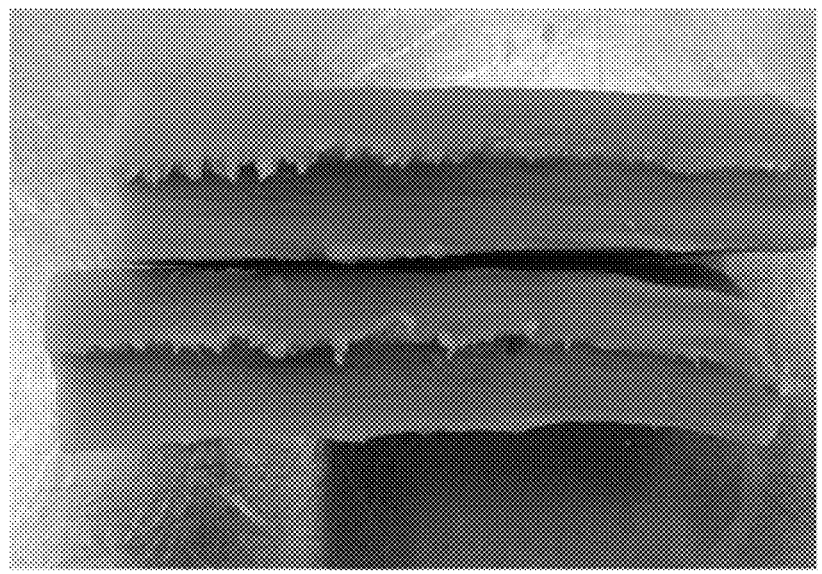
FIG. 2B shows structural characteristics of a base juicy HME after extrusion.

FIG. 2B shows structural characteristics of a base juicy HME after extrusion.

As shown by the base juicy HME after extrusion, the properties include:
High fibrous structure;
No juiciness;
High compactness;
High homogeneity;
High strength; and
High elasticity.

Figure 3A:
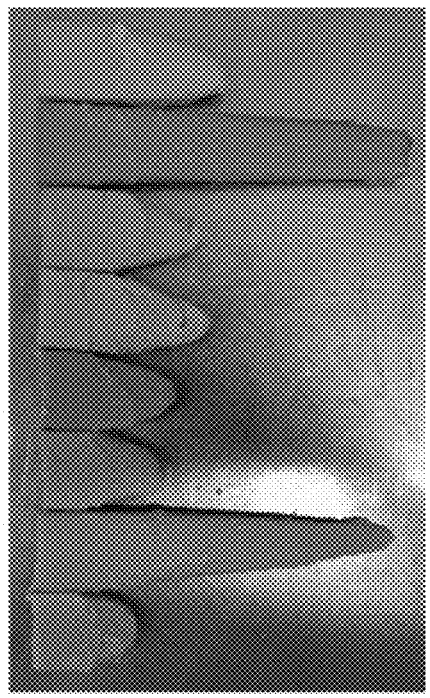
FIGS. 3A-3B show examples of HME material.
Figure 3B:
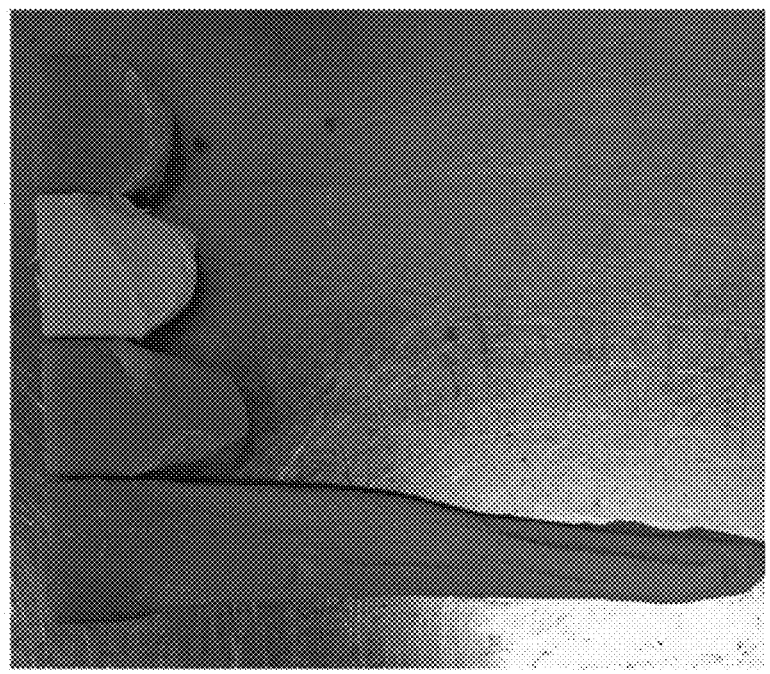

FIGS. 3A-3C show the creating of high fibrous HME.

Shown in FIGS. 3A-3C are different flow profiles. The length of the flow profile is an indicator of the degree of structure formation.

FIG. 3A shows the choosing of the high structure plant protein.

FIG. 3B shows the influence of the pH value.

Figure 4A:
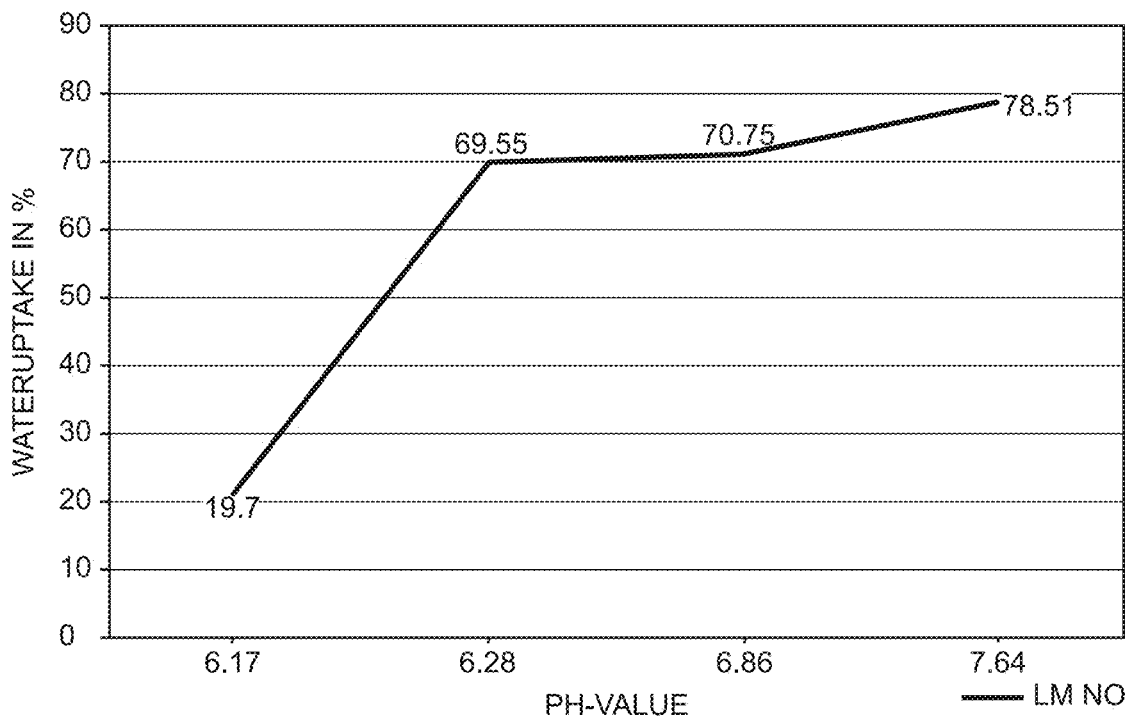
FIGS. 4A-4B show upon the opening of the base juicy HME structure, how the addition of sodium hydroxide influences pH value.
Figure 4B:
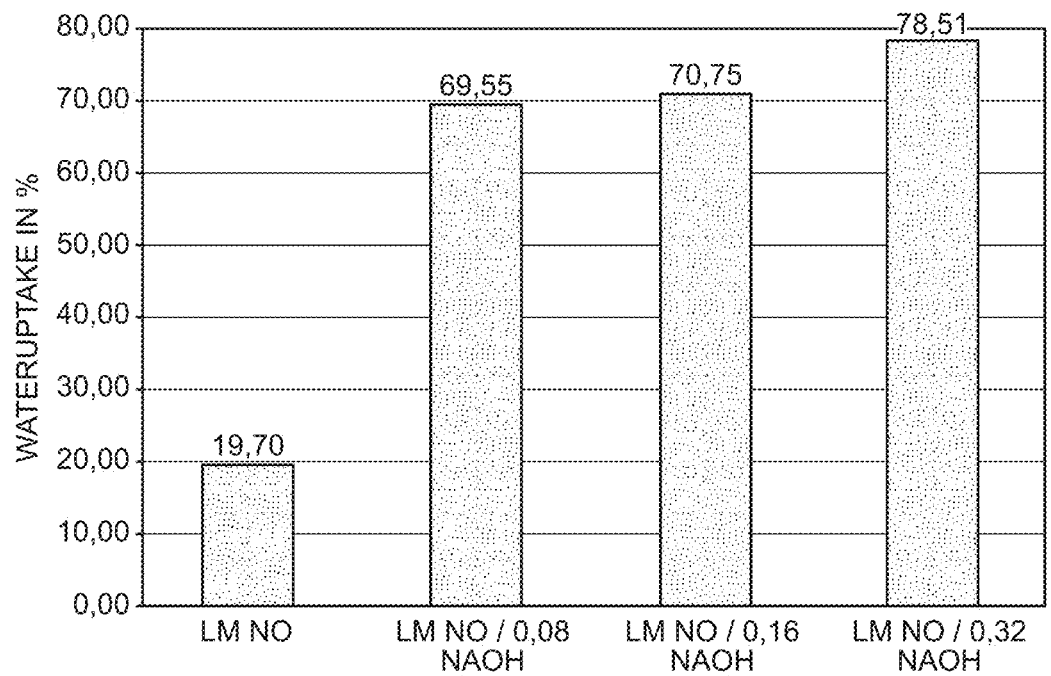

FIGS. 4A-4B show upon the opening of the base juicy HME structure, how the addition of Sodium Hydroxide influences pH value.

Figure 5A:
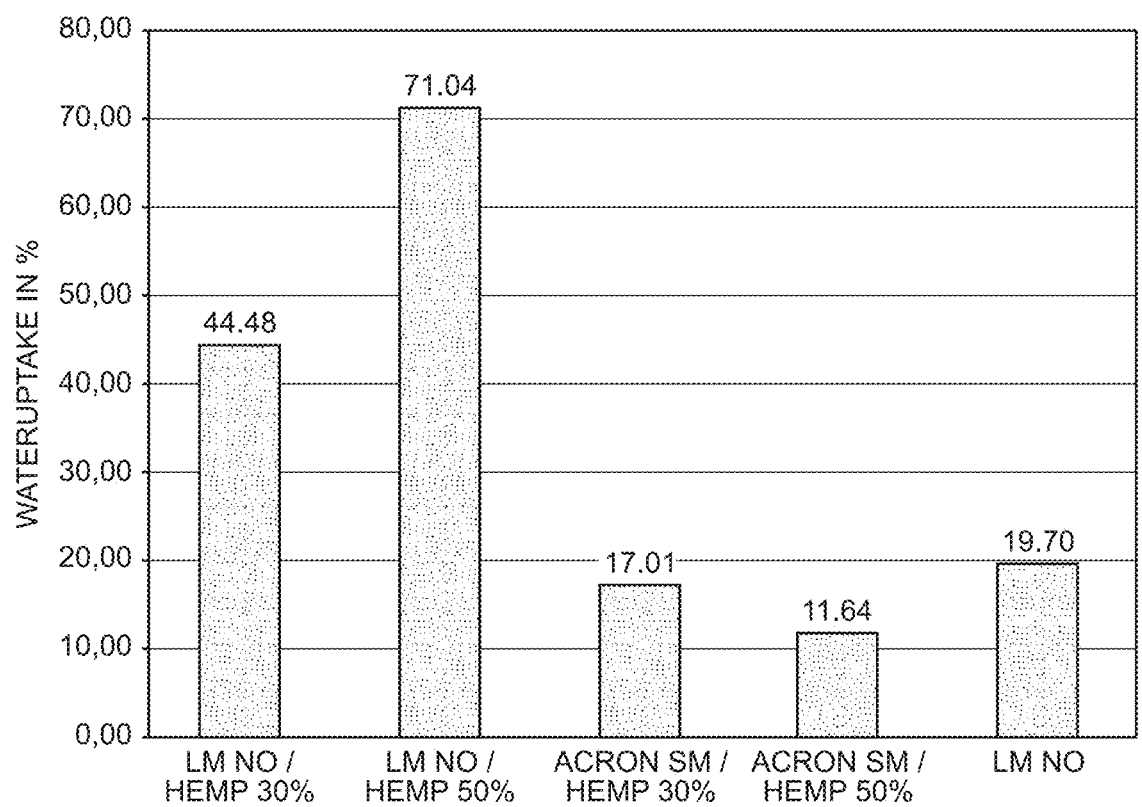
FIG. 5A shows a chart comparing water absorption of various extrudate compositions.

FIG. 5A shows a chart comparing water absorption of various extrudate compositions.

Figure 5B:
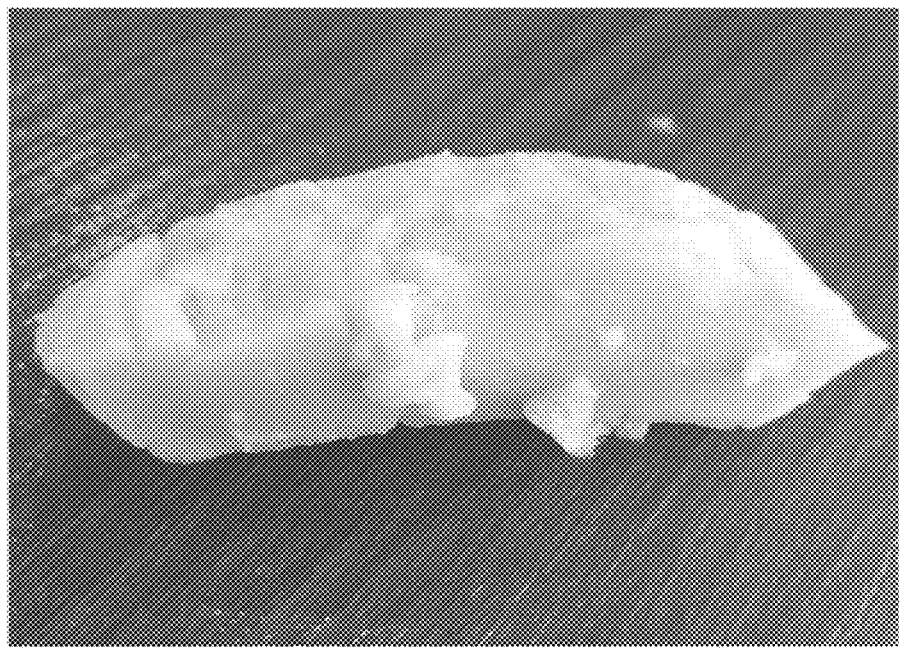
FIG. 5B shows an exemplary extrudate with high water uptake.

FIG. 5B shows an exemplary extrudate with high water uptake.

Figure 6A:
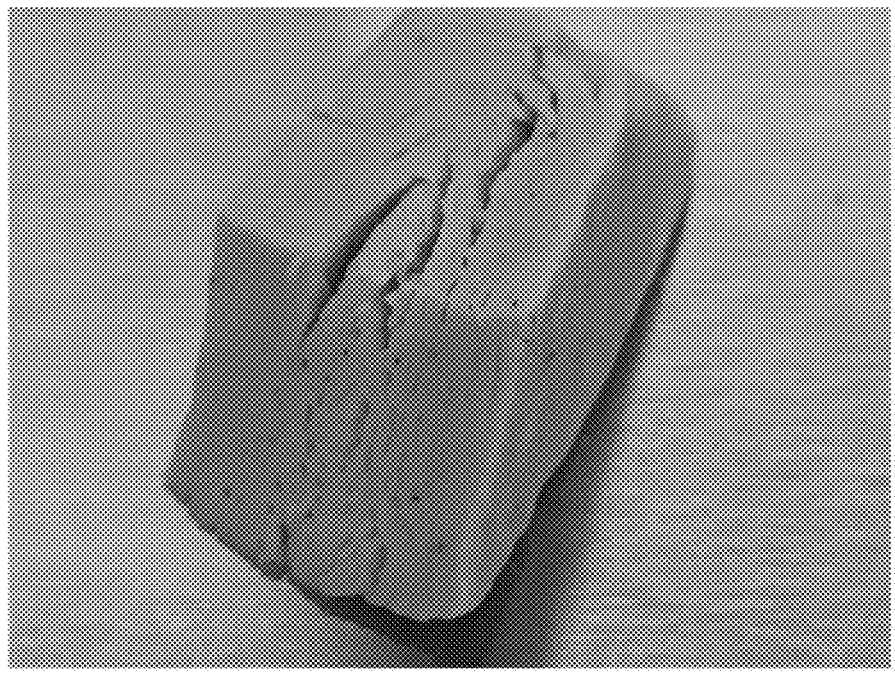
FIGS. 6A-6B show exemplary extrudates of 50% soy-50% hemp composition with high water uptake.
Figure 6B:
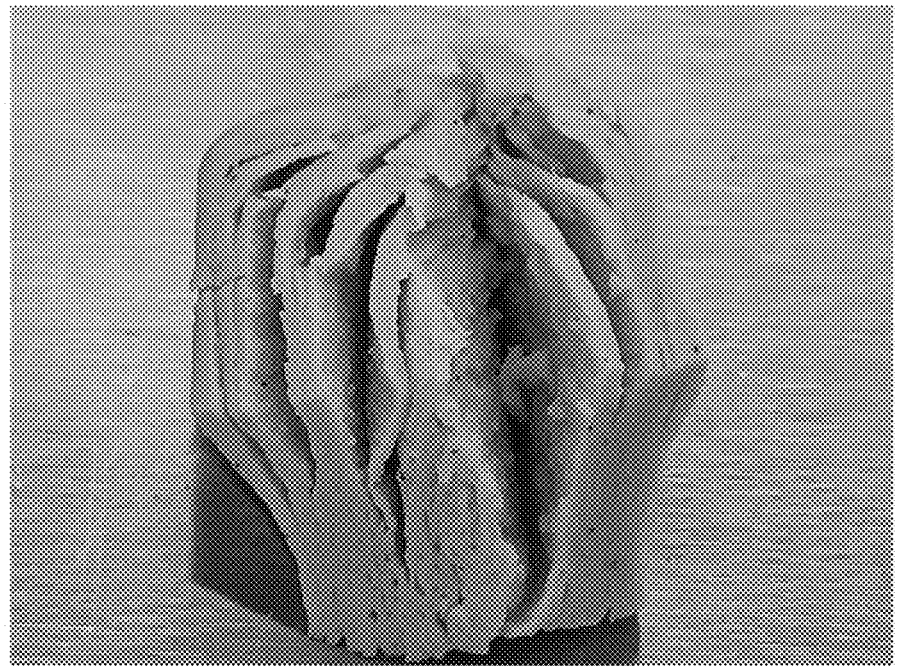

FIGS. 6A-6B show exemplary extrudates of 50% soy-50% hemp composition with high water uptake.

Figure 7A:
FIGS. 7A-7B show both uncooked and cooked HME material.
Figure 7B:
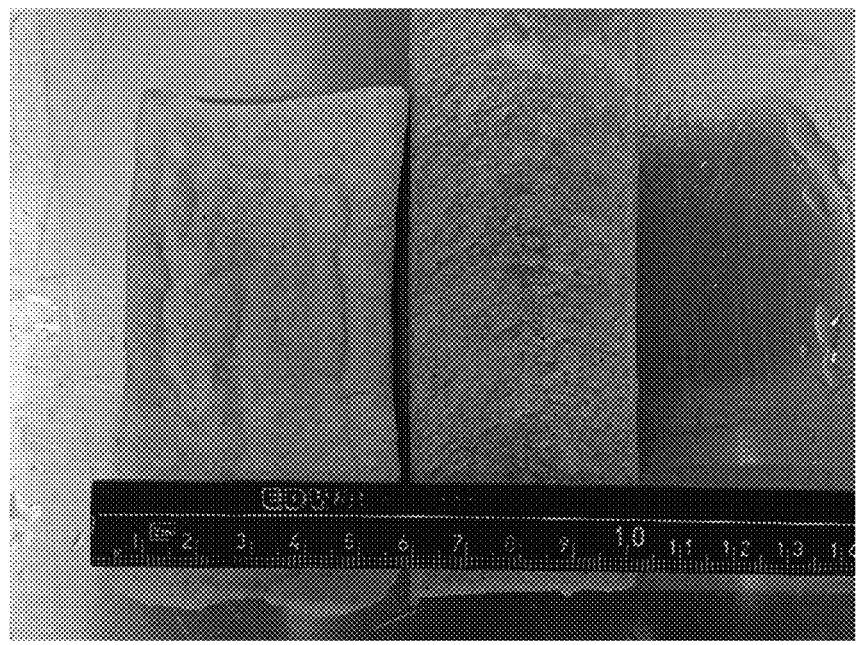

FIGS. 7A-7B show both uncooked and cooked HME material, with a view from the side and from the top. The increase in volume of the samples is caused by the combination of the special extrusion process and the high water uptake.

Figure 8:
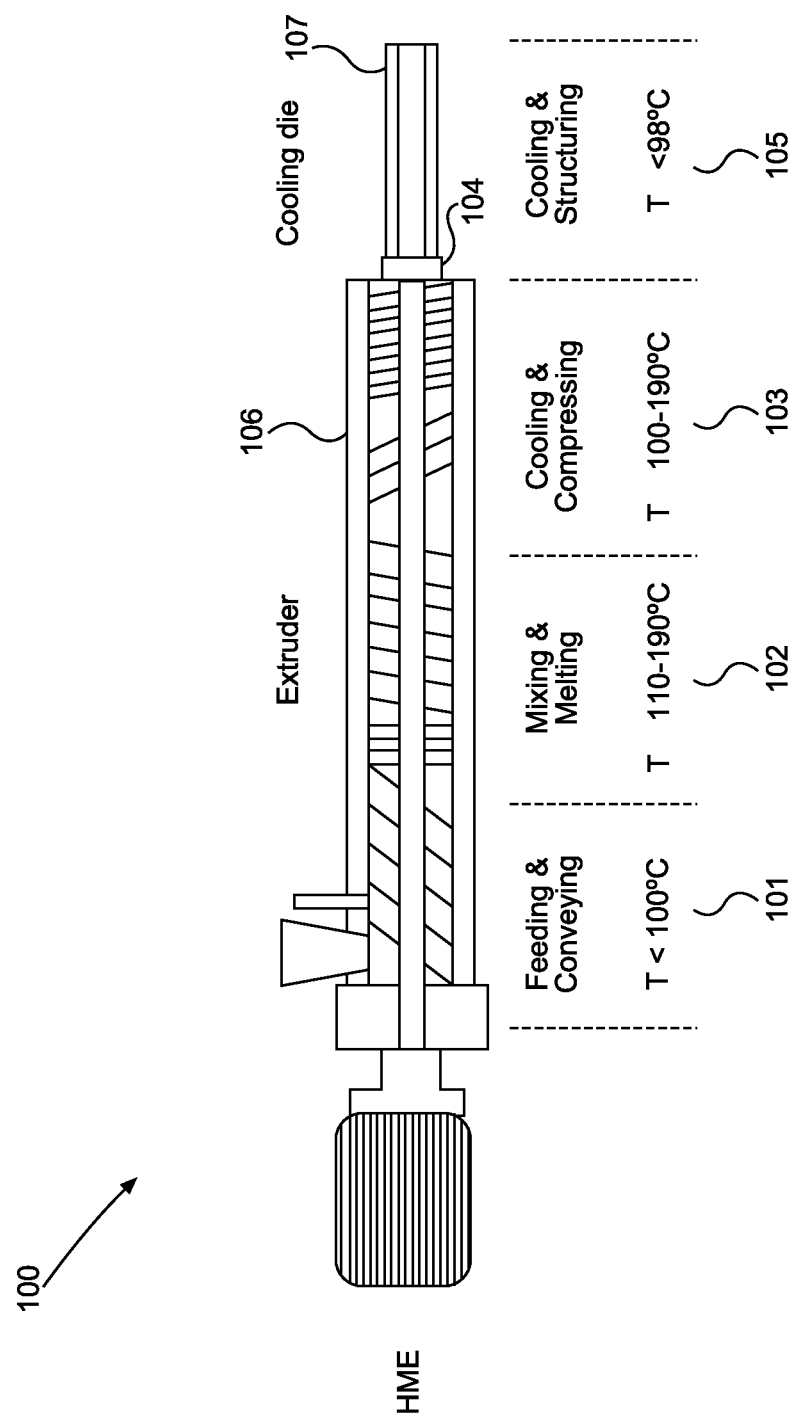
FIG. 8 is a diagrammatical representation of a high moisture extrusion (HME) process. Callout numbers originate from the underlying Provisional Patent Application Serial No. 63/305,170.

FIG. 8 is a simplified representation of the high moisture extrudate extrusion process 100, which is comprised of feeding material and conveying it 101 into an extruder 106, then mixing, heating, and melting 102 the extrudate mixture at 110-190° Celsius (230-374° F.), followed by cooling and compressing 103 the mixture in the extruder at a temperature 100-190° Celsius (230-374° F.). Finally, the extrudate material is fed into the cooling die 1-7 through the interim plate 104 which connects the extruder and cooling die. The cooling die 107 cools the extrudate mixture to an outlet temperature of temperature of under 98° Celsius (208° F.) and structures it 105. This schematic drawing is an example of one possible technical relationship/configuration between the extruder and the cooling die and does not purport to represent all other configurations, relationships, or sizes of either the extruder, the cooling die, or their possible configurations.

Figure 9A:
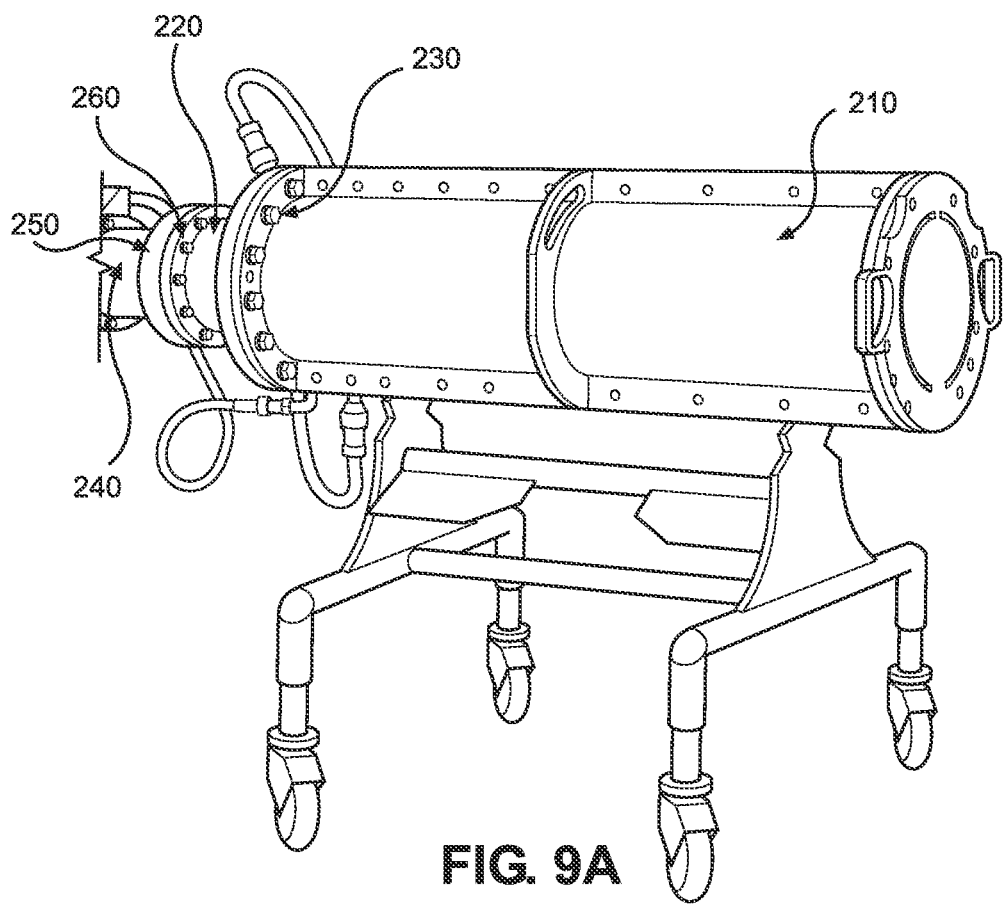
FIGS. 9A and 9B present two different views of a cooling die.
Callout numbers originate from the underlying Provisional Patent Application Serial No. 63/305,170.
Figure 9B:
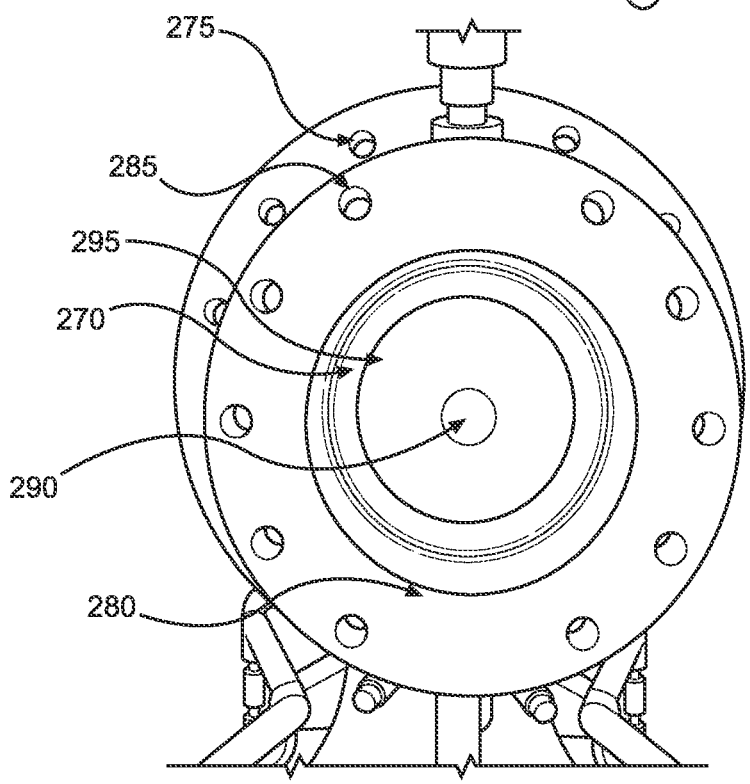

FIGS. 9A and 9B present two different views of a cooling die interim plate. In FIG. 9A a cooling die 210 can be seen connected to the interim plate 220. The interim plate may be connected to the cooling die 210 using an attachment mechanism 230 which may include any, or a combination of screws, bolts, fasteners, chains or other attachment mechanisms or other attachment mechanisms such as a locking rod, an elongated member or fastener (all these connection, fastening and attachment mechanisms are collectively referred to herein as "attachment mechanisms"). The extruder 240 may be seen and is also attached to the interim plate through its outlet end 250 via attachment mechanisms 260.

FIG. 9B presents a front view of the interim plate outlet end 270 connected to the cooling die 210. Apertures 275 may be used to connect and secure the interim plate 220 to the cooling die 210. The inlet end 280 of the interim plate is what attaches to the outlet end of an extruder via attachment mechanisms that may be connected through apertures 285. The cone 290 of the cooling die directs the flow of the extrudate into a ring shape which matches the inlet 295 (annular gap/inlet) of the cooling die 210.

Figure 10:
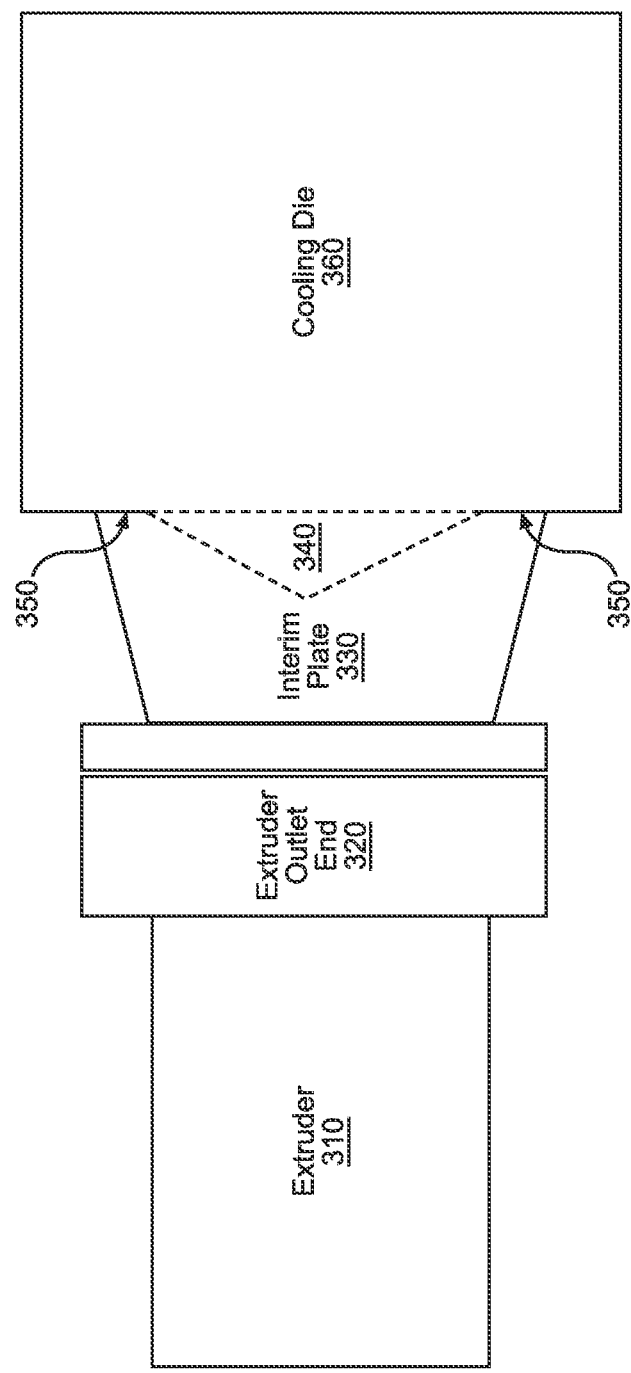
FIG. 10 presents one embodiment of an interim plate connecting an extruder and a cooling die.
Callout numbers originate from the underlying Provisional Patent Application Serial No. 63/305,170.

FIG. 10 is a diagrammatical representation of one embodiment of an interim plate connecting an extruder and a cooling die. Extruder 310 is connected to the interim plate 330 via the extruder outlet end 320. The extruder outlet end 320 and the interim plate 330 are connected via attachment mechanisms. The interim plate 330 facilitates the flow of extrudate to the inlet 350 of the cooling die 360. The interim plate is connected to the cooling die 360 via attachment mechanisms.

FIGS. 11A-11B present one embodiment of a traditional cooling die inlet end. FIG. 11A presents a front view of a cooling die inlet end 400. The inlet end 400 may include a cooling die jacket 403 with one or more fastening or screw holes 405. The cooling die inlet end may also include a cone 401 to direct the movement of extrudate to the one or more flow channel entrances 404. FIG. 11B presents a side view of the cooling die inlet end 400 and presents the cone 401 as surrounded by a cone jacket 402.

FIGS. 12A-12C present one embodiment of high velocity cooling die stream inlets. FIG. 12A presents a front view of a cooling die inlet end 500 with high velocity stream inlets composed of a combination of a diffuser 504 to allow extrudate enter the cooling die at a high velocity and the inlet and a boundary piece 506 to bound the diffuser 504. The cooling die jacket 503 may contain one or more fastening or screw holes 505 to attack attach the cooling die to an interim plate. The diffuser 504 may be narrower at one end and wider at the other end allowing for different rates of flow. In preferred embodiments, the diffuser is wider at the point of entry 507 of the extrudate into the cooling die than the point of exit 508 of the extrudate into the cooling die forcing the extrudate into a narrower channel and increasing its velocity as well as the length of the fibers that are formed when exiting the cooling die inlet into the cooling die creating a higher extrudate flow velocity.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for creating a protein extrudate with above forty percent water absorption, the method comprising:
feeding a protein material into an extruder;
feeding water into the extruder;
increasing the absorptivity of a protein extrudate by:
  feeding pure Nitrogen gas into the extruder; and
  feeding an additive into the extruder to increase a pH of the protein extrudate;
controlling a temperature of the extruder;
forming improved texture and longer fibers of the protein extrudate by extruding into an interim plate, the protein material, the water, the pure Nitrogen gas, and the additive, the interim plate being in fluid communication with the extruder and with a cooling die;
cooling the protein extrudate, the cooling comprising:
  flowing the protein extrudate from the interim plate into one or more entrance cones coupled to one or more flow channel entrances of the cooling die, the one or more entrance cones directing movement of the protein extrudate into the one or more flow channel entrances and increasing rate of flow of the protein extrudate into the cooling die;
  increasing rate of flow of the protein extrudate into the cooling die by flowing the protein extrudate from the one or more flow channel entrances into one or more inlets coupled to the one or more flow channel entrances, each of the one or more inlets comprising a diffuser and a boundary piece to bind the diffuser, the diffuser having an entry opening and an exit opening, the entry opening being wider than the exit opening; and
  reducing the temperature of the protein extrudate to under 98 degrees Celsius; and
boiling the protein extrudate in the water until the protein extrudate comprises the above forty percent water absorption.

2. The method of claim 1, further comprising:
opening structure and surface of the protein extrudate using mechanical stress.

3. The method of claim 2, wherein the mechanical stress comprises applying a needle roller to the protein extrudate.

4. The method of claim 3, further comprising:
adding steam and water between the extruder and a die.

5. The method of claim 4, further comprising:
increasing water absorption to approximately 80% after the extruder.

6. The method of claim 1, wherein the protein material comprises a combination of hemp and soy.

7. The method of claim 1, wherein the protein material comprises a combination of hemp and gluten.

8. The method of claim 1, wherein the protein material comprises a combination of hemp, soy and gluten.

9. The method of claim 1, wherein the additive comprises sodium hydroxide in a range of approximately 0.05% to approximately 1.00%.

10. The method of claim 5, further comprising boiling the protein extrudate in water to achieve high water absorption of between approximately 20% and 120%.

11. The method of claim 5, further comprising boiling the protein extrudate in water and spice to achieve high water and spice absorption of between approximately 20% and 120%.

12. The method of claim 4, further comprising adding a marinade before or during cooking.

13. The method of claim 12, wherein a content of the marinade ranges from approximately 1% to approximately 20%.

14. The method of claim 6, wherein the combination is 25% hemp and 75% soy.

15. The method of claim 6, wherein the combination is 35% hemp and 65% soy.

16. The method of claim 6, wherein the combination is 45% hemp and 55% soy.

17. The method of claim 6, wherein the combination is 55% hemp and 45% soy.

18. A method for creating a protein extrudate with above eighty percent water absorption, the method comprising:
feeding water into an extruder and feeding a protein material into the extruder, the protein material comprising a combination of hemp and soy;
increasing the absorptivity of the protein material by feeding an additive into the extruder to increase a pH;
controlling a temperature of the extruder;
forming improved texture and longer fibers of the protein extrudate by extruding into an interim plate the protein material, the water and the additive, the interim plate being in fluid communication with the extruder and with a cooling die;
opening a structure and surface of the protein extrudate using mechanical stress, the mechanical stress comprising applying a needle roller to the protein extrudate;
cooling the protein extrudate, the cooling comprising:
flowing the protein extrudate from the interim plate onto a surface of an entrance cone, the entrance cone coupled to one or more flow channel entrances of the cooling die, the entrance cone directing movement of the protein extrudate into the one or more flow channel entrances;
flowing the protein extrudate from the one or more flow channel entrances into one or more inlets coupled to the one or more flow channel entrances, the one or more inlets comprising a diffuser and a boundary piece to bind the diffuser, the diffuser having an entry opening and an exit opening, the entry opening being wider than the exit opening; and
reducing the temperature of the protein extrudate to under 98 degrees Celsius.

19. A method for creating protein extrudate with above eighty percent water absorption, the method comprising:
feeding water into an extruder and feeding a protein material into the extruder, the protein material comprising a combination of hemp and soy;
increasing the absorptivity of a protein extrudate by feeding an additive into the extruder to increase a pH, the additive comprising sodium hydroxide in a range of 0.05% to 1.00% and nitrogen in a range of 0.01% to a 5.00%;
controlling a temperature of the extruder by maintaining the temperature of the extruder between 100 degrees Celsius to 200 degrees Celsius;
forming improved texture and longer fibers of the protein extrudate by extruding into an interim plate a mixture of the protein material, the water, and the additive, the interim plate being in fluid communication with the extruder and with a cooling die;
opening a structure and surface of the protein extrudate using mechanical stress, the mechanical stress comprising applying a needle roller to the protein extrudate;
cooling the protein extrudate, the cooling comprising:
flowing the protein extrudate from the interim plate onto a surface of an entrance cone, the entrance cone coupled to one or more flow channel entrances of the cooling die, the entrance cone directing movement of the protein extrudate into the one or more flow channel entrances
flowing the protein extrudate from the one or more flow channel entrances into one or more inlets coupled to the one or more flow channel entrances, the one or more inlets comprising a diffuser and a boundary piece to bind the diffuser, the diffuser having an entry opening and an exit opening, the entry opening being wider than the exit opening; and
reducing the temperature of the protein extrudate to under 98 degrees Celsius; and
boiling the protein extrudate in the water until the protein extrudate comprises the above eighty percent water absorption.

* * * * *

UNITED STATES PATENT AND TRADEMARK OFFICE
CERTIFICATE OF CORRECTION

| | | |
|---|---|---|
| PATENT NO. | : 12,004,539 B2 | Page 1 of 1 |
| APPLICATION NO. | : 17/829165 | |
| DATED | : June 11, 2024 | |
| INVENTOR(S) | : Marco Schlüter and Achim Knoch | |

It is certified that error appears in the above-identified patent and that said Letters Patent is hereby corrected as shown below:

On the Title Page

Item (54) and in the Specification, Column 1, Lines 1-3 The title:
"Methods for Creating of High Fibrousness, High Moisture Extrudates"
Should read:
"Methods for Creating High Fibrousness, High Moisture Extrudates"

Signed and Sealed this
First Day of October, 2024

Katherine Kelly Vidal
*Director of the United States Patent and Trademark Office*